United States Patent
Itakura

(10) Patent No.: US 11,809,039 B2
(45) Date of Patent: Nov. 7, 2023

(54) DISPLAY DEVICE HAVING A CURVED SURFACE AND A PLURALITY OF LIGHT GUIDES COVERED BY AN OPTICAL SHEET

(71) Applicant: Japan Display Inc., Tokyo (JP)

(72) Inventor: Shimon Itakura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/990,384

(22) Filed: Nov. 18, 2022

(65) Prior Publication Data

US 2023/0084997 A1 Mar. 16, 2023

Related U.S. Application Data

(63) Continuation of application No. 17/545,648, filed on Dec. 8, 2021, now Pat. No. 11,506,928, which is a continuation of application No. 17/021,383, filed on Sep. 15, 2020, now Pat. No. 11,215,871, which is a
(Continued)

(30) Foreign Application Priority Data

Mar. 16, 2018 (JP) ................. 2018-049945

(51) Int. Cl.
G02F 1/13357 (2006.01)
B60Q 3/14 (2017.01)
B60Q 3/62 (2017.01)
F21V 8/00 (2006.01)
G02F 1/01 (2006.01)

(52) U.S. Cl.
CPC ......... *G02F 1/133602* (2013.01); *B60Q 3/14* (2017.02); *B60Q 3/62* (2017.02); *G02B 6/0088* (2013.01); *G02F 1/01* (2013.01); *G02F 1/011* (2013.01)

(58) Field of Classification Search
CPC .. G02B 6/0078; G02B 6/0075; G02B 6/0088; G02B 6/0086; G02B 6/009; G02B 6/0091; B60Q 3/62; G02F 1/133602
See application file for complete search history.

(56) References Cited

U.S. PATENT DOCUMENTS

| 8,223,296 | B2 | 7/2012 | Lee et al. |
| 11,656,699 | B2 * | 5/2023 | Oki ..................... G02B 6/0091 345/173 |
| 2009/0273733 | A1 | 11/2009 | Shimura et al. |

(Continued)

FOREIGN PATENT DOCUMENTS

| JP | 2001-134205 A | 5/2001 |
| JP | 2009-021196 A | 1/2009 |

(Continued)

OTHER PUBLICATIONS

Chinese Office Action dated Feb. 3, 2023 in corresponding Chinese Application No. 201980018684.9.

(Continued)

*Primary Examiner* — Robert J May
(74) *Attorney, Agent, or Firm* — K&L Gates LLP

(57) ABSTRACT

A display device having a curved display surface is provided and includes a back cover; a plurality of light guide plates supported by the back cover; a plurality of light sources configured to cause light to be incident on the light guide plates; and an optical sheet covering the light guide plates, wherein the optical sheet faces the light guide plates.

13 Claims, 6 Drawing Sheets

Related U.S. Application Data continuation of application No. PCT/JP2019/010380, filed on Mar. 13, 2019.

(56) References Cited

U.S. PATENT DOCUMENTS

| | | |
|---|---|---|
| 2009/0303410 A1 | 12/2009 | Murata et al. |
| 2010/0141167 A1 | 6/2010 | Kato |
| 2012/0327307 A1 | 12/2012 | Nakamura et al. |
| 2013/0321740 A1 | 12/2013 | An et al. |
| 2014/0055507 A1 | 2/2014 | Sakurai et al. |
| 2016/0216432 A1 | 7/2016 | Kim et al. |

FOREIGN PATENT DOCUMENTS

| | | |
|---|---|---|
| JP | 2009-152152 A | 7/2009 |
| JP | 2010-021131 A | 1/2010 |
| JP | 2011-198746 A | 10/2011 |
| JP | 2012-054056 A | 3/2012 |
| JP | 2012-234830 A | 11/2012 |
| JP | 2013-242525 A | 12/2013 |
| JP | 2014-041725 A | 3/2014 |
| JP | 2016-136115 A | 7/2016 |
| JP | 2016-136520 A | 7/2016 |
| JP | 2018-032526 A | 3/2018 |

OTHER PUBLICATIONS

International Search Report issued in connection with PCT/JP2019/010380, dated Jun. 4, 2019.

Chinese Office Action dated Aug. 16, 2022 in corresponding Chinese Application No. 201980018684.9.

Japanese Office Action dated Jan. 4, 2022 in corresponding Japanese Application No. 2018-049945.

* cited by examiner

DISPLAY DEVICE HAVING A CURVED SURFACE AND A PLURALITY OF LIGHT GUIDES COVERED BY AN OPTICAL SHEET

CROSS-REFERENCE TO RELATED APPLICATIONS

This application is a continuation of U.S. patent application Ser. No. 17/545,648, filed on Dec. 8, 2021, which is a continuation of U.S. patent application Ser. No. 17/021,383, filed on Sep. 15, 2020, issued as U.S. Pat. No. 11,215,871 on Jan. 4, 2022, which is a continuation of International Patent Application No. PCT/JP2019/010380, filed on Mar. 13, 2019, which claims the priority benefit from Japanese Patent Application No. 2018-049945, filed on Mar. 16, 2018, the entire contents of which are incorporated herein by reference.

BACKGROUND

1. Technical Field

What is disclosed herein relates to a display device.

2. Description of the Related Art

As disclosed in Japanese Patent Application Laid-open Publication No. 2016-136520 or Japanese Patent Application Laid-open Publication No. 2013-242525, it is known that there are display devices including a display panel bonded to a front plate having a curved surface.

In recent years, display devices have been expected to have a larger screen in some cases.

For the foregoing reasons, there is a need for a display device having a larger screen composed of a plurality of display panels.

SUMMARY

A display device according to an aspect of the present disclosure includes: a translucent front plate; a plurality of display panels each of which is bonded to the front plate and smaller than the front plate; and a backlight unit comprising a plurality of light guide plates disposed facing the respective display panels in one-to-one correspondence and a light source configured to cause light to be incident on the light guide plates.

DETAILED DESCRIPTION

Figure 1:
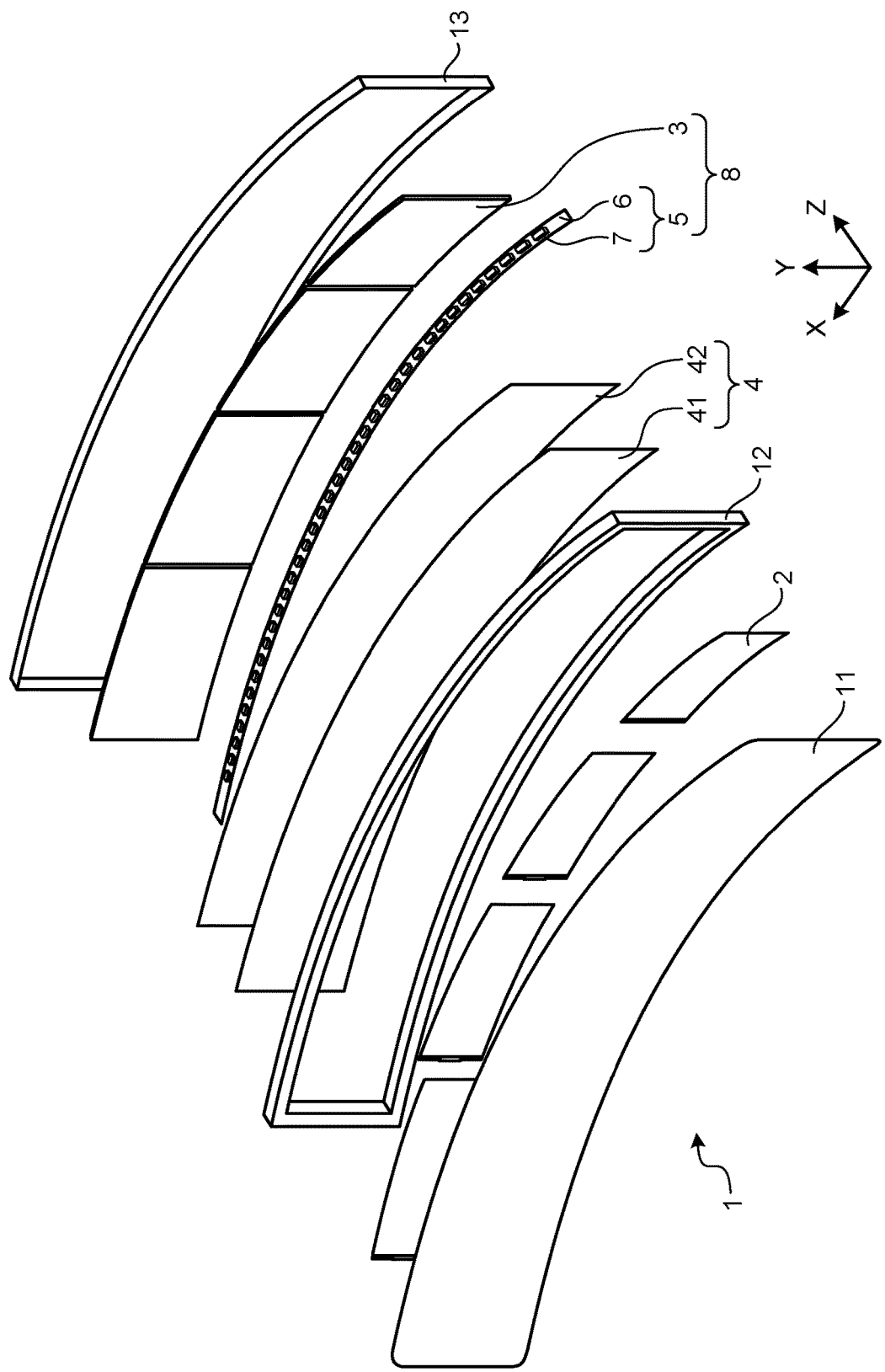
FIG. 1 is an exploded perspective view of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by the same reference numerals, and detailed explanation thereof may be appropriately omitted.

In this disclosure, when an element is described as being "on" another element, the element can be directly on the other element, or there can be one or more elements between the element and the other element.

First Embodiment

Figure 2:
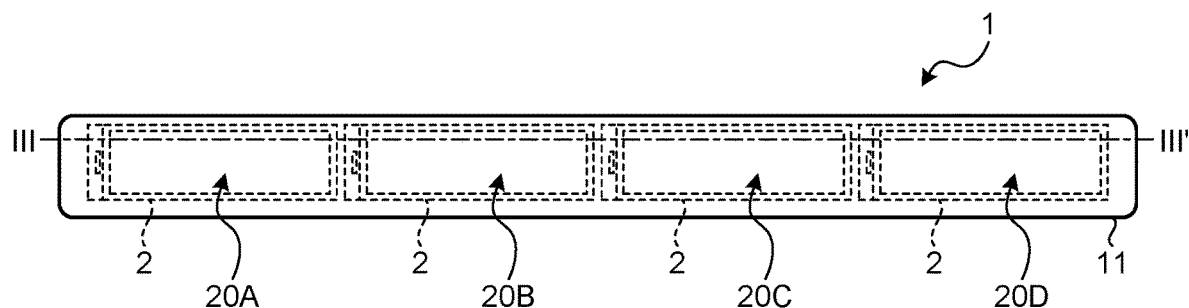
FIG. 2 is a plan view of the display device according to the first embodiment viewed from a front plate.
Figure 2:
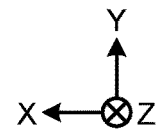
Figure 3:
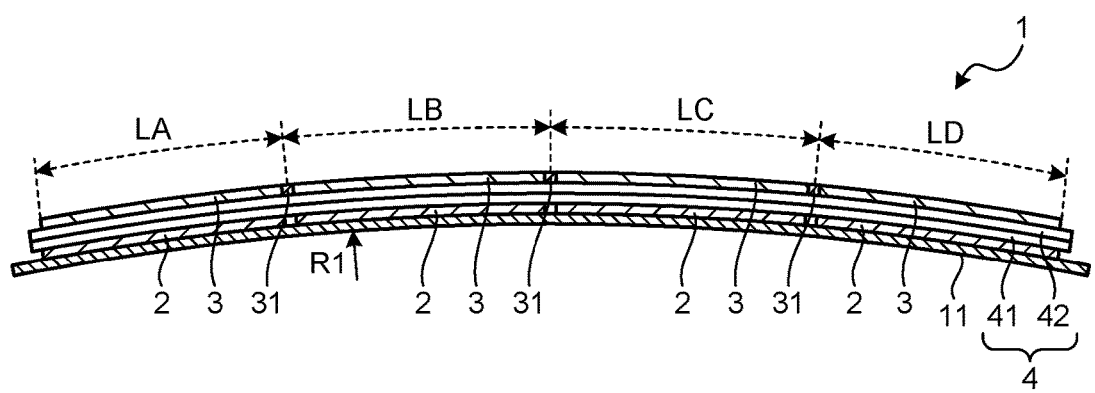
FIG. 3 is an explanatory diagram for explaining a multilayered state of a front plate, display panels, an optical sheet, and light guide plates of the display device according to the first embodiment.
Figure 3:
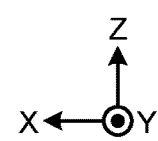
Figure 4:
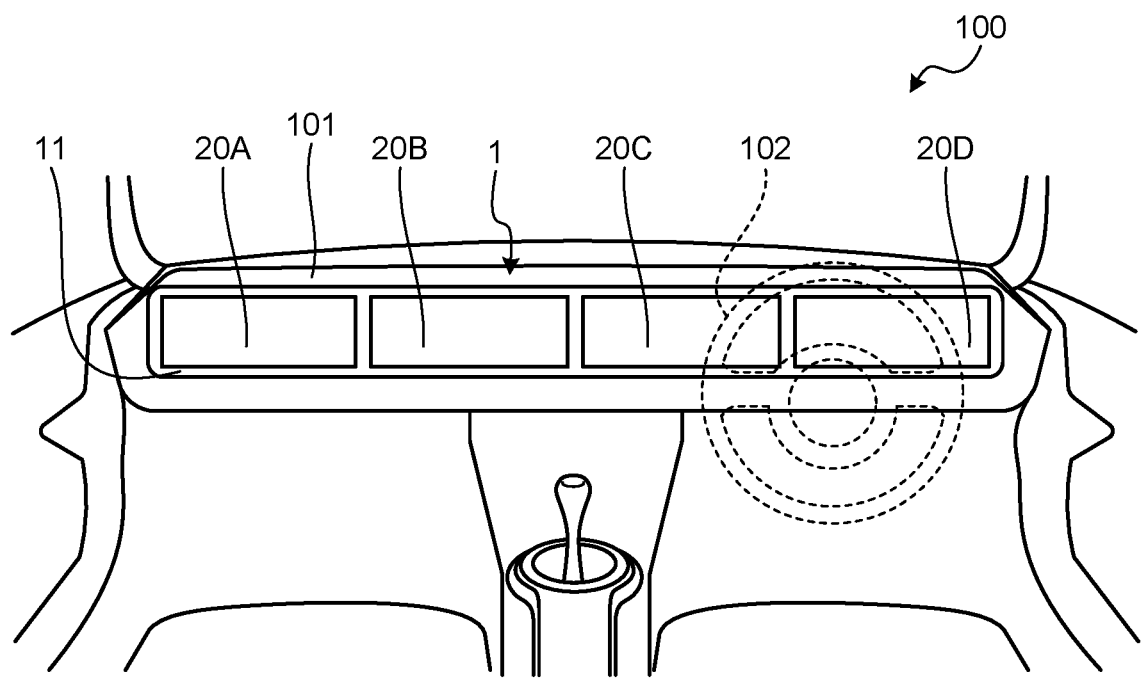
FIG. 4 is a schematic diagram of a vehicle provided with the display device according to the first embodiment.

FIG. 1 is an exploded perspective view of a display device according to a first embodiment. FIG. 2 is a plan view of the display device according to the first embodiment viewed from a front plate. FIG. 3 is an explanatory diagram for explaining a multilayered state of a front plate, display panels, an optical sheet, and light guide plates of the display device according to the first embodiment. FIG. 3 illustrates the multilayered state of a front plate 11, display panels 2, an optical sheet 4, and light guide plates 3 on the section along line of FIG. 2. FIG. 4 is a schematic diagram of a vehicle provided with the display device according to the first embodiment.

In the following description, an X-Y-Z rectangular coordinate system is used. The X-axis is parallel to the long side of the display panel 2. The Y-axis is parallel to a line passing through both ends of the display panel 2 when viewed in the direction along the X-axis. The Z-axis is orthogonal to both the X-axis and the Y-axis. The direction along the X-axis is referred to as an X-direction, the direction along the Y-axis is referred to as a Y-direction, and the direction along the Z-axis is referred to as a Z-direction.

As illustrated in FIG. 1, a display device 1 according to the first embodiment includes the front plate 11, the display panels 2, the optical sheet 4, and a backlight unit 8 including the light guide plates 3 and a light source 5. The display device 1 according to the first embodiment further includes a front frame 12 and a back cover 13. This structure forms a space surrounded by the front plate 11, the front frame 12, and the back cover 13. This space houses the display panels 2, the optical sheet 4, and the backlight unit 8.

While the first embodiment exemplifies the front frame 12 and the back cover 13, the housing of the display device 1 is not limited to the shape defined by the front frame 12 or the back cover 13. The back cover 13 according to the first embodiment has a structure that can support the light guide plates 3. Therefore, if the display device 1 is disposed with the Z-axis extending along the vertical direction, the weight of the light guide plates 3 is less likely to act on the display panels 2 as stress. To support the light guide plates 3, the back cover 13 is made of metal material.

The front plate 11 is a cover member that protects the display panels 2. The front plate 11 is made of glass, for example. The display panels 2 are bonded to the front plate 11 with an adhesive layer, which is not illustrated, interposed therebetween. As illustrated in FIG. 2, the front plate 11 has a rectangular shape when viewed from the front.

As illustrated in FIG. 3, the front plate 11 is curved as a whole with curvature R1. In this manner, the front plate 11 has a curved part. The front plate 11 is made of translucent glass or synthetic resin. A viewer can see video that appears to be displayed on a display surface along the surface of the front plate 11.

The display panel 2 is a liquid crystal panel, for example. The display panel 2 includes a first substrate, a second substrate, and a liquid crystal layer sandwiched between the first substrate and the second substrate. The first substrate and the second substrate are made of glass, for example. The first substrate and the second substrate are each provided with an optical film, such as a polarization plate. The display panels 2 are bonded to the front plate 11, thereby being curved along the curvature of the surface of the front plate 11. Both ends of the front plate 11 in the X-axis direction are closer to the viewer than the center part is when viewed from the viewer.

As illustrated in FIG. 2, four display panels 2 are bonded to the front plate 11. The display panel 2 is smaller than the front plate 11 in planar view. The number of display panels 2 bonded to the front plate 11 simply needs to be more than one. As the number of display panels 2 increases, the display device 1 can have a larger screen.

As illustrated in FIG. 2, the display device 1 has a display region 20A, a display region 20B, a display region 20C, and a display region 20D depending on the positions of the display panels 2. With this configuration, the display panels 2 corresponding to the display regions 20A, 20B, 20C, and 20D can have different specifications. The display regions 20A, 20B, 20C, and 20D have different resolutions. Examples of the resolution include, but are not limited to, VGA, WVGA, quarter HD (qHD), 720 HD, Full-HD, etc.

VGA indicates a resolution of 640×480 pixels on display disposed in a matrix (row-column configuration). WVGA indicates a resolution of 800×480 pixels on display disposed in a matrix. Quarter HD (qHD) indicates a resolution of 960×540 pixels on display disposed in a matrix. 720 HD indicates a resolution of 1280×720 pixels on display disposed in a matrix. Full-HD indicates a resolution of 1920×1080 pixels on display disposed in a matrix. Full-HD indicates a resolution of 2560×1600 pixels on display disposed in a matrix.

The display panels 2 corresponding to the respective display regions 20A, 20B, 20C, and 20D may have different specifications in response speed. At least one of the display panels 2 corresponding to the respective display regions 20A, 20B, 20C, and 20D may include a touch panel. The touch panel may use part of wiring of the display panel 2 to implement its functions. The touch panel may be externally provided to the display panel 2 and disposed between the front plate 11 and the display panel 2.

The display panels 2 corresponding to the respective display regions 20A, 20B, 20C, and 20D may have different specifications of switching elements. Of the display panels 2 corresponding to the respective display regions 20A, 20B, 20C, and 20D, at least one display panel may be provided with a switching element made of low-temperature polycrystalline silicon, and the other display panels may be provided with switching elements made of amorphous silicon.

As illustrated in FIG. 4, the display device 1 is mounted on a dashboard 101 of a vehicle 100, for example. In this use example, the display device 1 has the advantage that the shape of the front plate 11 of the display device 1 smoothly fits to the curved interior of the dashboard 101 because the surface of the front plate 11 is curved. The display regions 20A, 20B, 20C, and 20D each display any one of a navigation system, a speedometer, a tachometer, a fuel gauge, and a water-temperature gauge, for example.

The vehicle 100 according to the first embodiment is a right-hand drive vehicle. The display regions closer to a steering wheel 102 are the display regions 20C and 20D.

Figure 5:
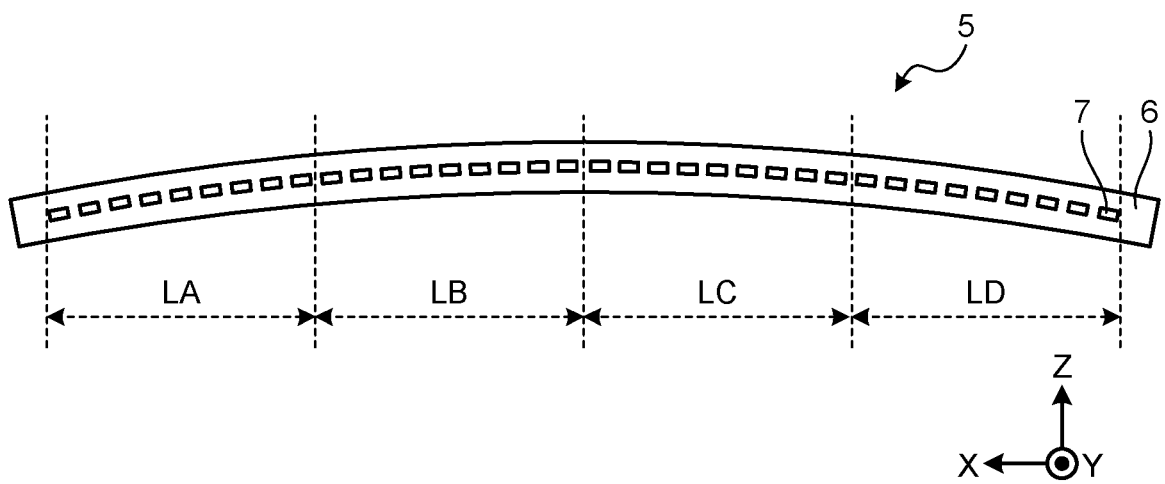
FIG. 5 is a plan view of a light source according to the first embodiment.

As illustrated in FIG. 1, the light source 5 includes a plurality of light emitting elements 7 and a flexible substrate 6. The light emitting elements 7 are arrayed on the flexible substrate 6 such that they are disposed facing one side surface of the light guide plates 3. FIG. 5 is a plan view of the light source according to the first embodiment. As illustrated in FIG. 5, the flexible substrate 6 is curved as a whole so as to extend along the curvature R1 (refer to FIG. 3) of the front plate 11. The light emitting elements 7 are arrayed along the side surface of the light guide plates 3 illustrated in FIG. 1. The flexible substrate 6 may have a rectangular shape, and the light emitting elements 7 may be arrayed along the side surface of the light guide plates 3 illustrated in FIG. 1.

The light emitting elements 7 disposed in a region LA illustrated in FIG. 5 emit light to the light guide plate 3 disposed in the region LA illustrated in FIG. 3. The light guide plate 3 in the region LA illustrated in FIG. 3 is disposed in one-to-one correspondence with the display panel 2 corresponding to the display region 20A illustrated in FIG. 2. The light emitting elements 7 disposed in a region LB illustrated in FIG. 5 emit light to the light guide plate 3 disposed in the region LB illustrated in FIG. 3. The light guide plate 3 in the region LB illustrated in FIG. 3 is disposed in one-to-one correspondence with the display panel 2 corresponding to the display region 20B illustrated in FIG. 2.

Similarly, the light emitting elements 7 disposed in a region LC illustrated in FIG. 5 emit light to the light guide plate 3 disposed in the region LC illustrated in FIG. 3. The light guide plate 3 in the region LC illustrated in FIG. 3 is disposed in one-to-one correspondence with the display panel 2 corresponding to the display region 20C illustrated in FIG. 2. The light emitting elements 7 disposed in a region LD illustrated in FIG. 5 emit light to the light guide plate 3 disposed in the region LD illustrated in FIG. 3. The light guide plate 3 in the region LD illustrated in FIG. 3 is disposed in one-to-one correspondence with the display panel 2 corresponding to the display region 20D illustrated in FIG. 2.

As illustrated in FIG. 1, the light guide plates 3 are aligned in the X-axis direction, thereby efficiently emitting light to the respective display panels 2 without any curved surface part on the emitting surface. With this configuration, the light guide plates 3 can each have a flat emitting surface facing the corresponding display panel 2. As a result, the manufacturing cost of the light guide plates 3 can be reduced.

If the four light guide plates 3 are integrated, the integrated one has a heavier weight, which makes it difficult to assemble. By contrast, the light guide plates 3 according to the first embodiment are disposed in one-to-one correspondence with the respective display panels 2. With this configuration, the light guide plates 3 each have a lighter weight, which makes it easy to assemble.

The numbers of light emitting elements 7 disposed in the respective regions LA, LB, LC, and LD according to the first embodiment are equal to one another. The gaps between adjacent pairs of the light emitting elements 7 in the regions LA, LB, LC, and LD are formed at the same pitch.

As illustrated in FIG. 3, the display device 1 includes the light guide plates 3 disposed in one-to-one correspondence with the respective display panels 2 in the regions LA, LB, LC, and LD. As illustrated in FIG. 3, pairs of the light guide plate 3 and the display panel 2 sandwich the common optical sheet 4 at the respective positions of the regions LA, LB, LC, and LD.

The gaps between adjacent pairs of the light guide plates 3 are filled with a filler 31 made of translucent optical resin or translucent silicone resin. This structure suppresses reduction in luminance between the light guide plates 3. The filler 31 has a buffering function of preventing the light guide plates 3 from coming into contact with each other and making an unusual sound if vibrations are transmitted to the display device 1. The use of translucent silicone resin for the filler 31 improves the function of suppressing an unusual sound against vibrations because the elastic modulus of silicone resin is higher than that of optical resin.

The optical sheet 4 includes a luminance enhancement film 41 and a light diffusion film 42. The luminance enhancement film 41 has a function of enhancing the luminance level of emission light from the backlight unit 8.

Figure 6:
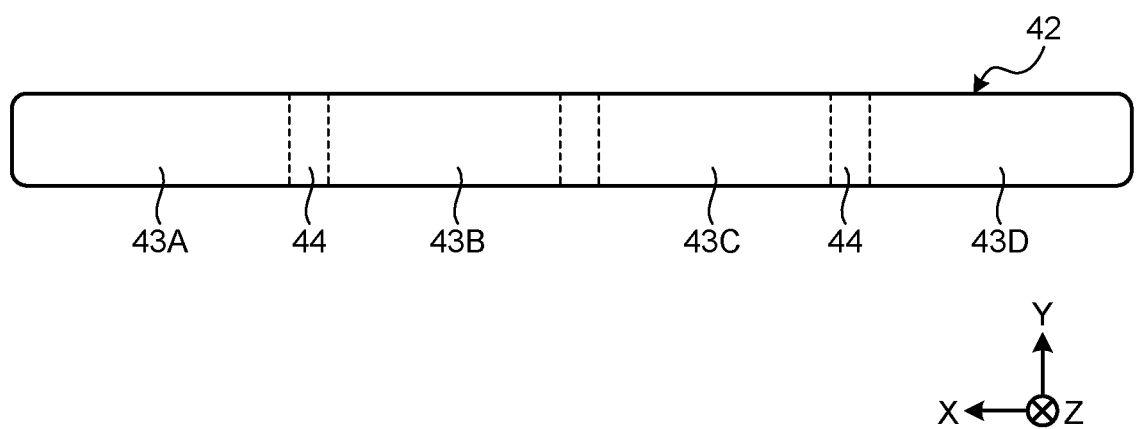
FIG. 6 is a plan view for explaining a light diffusion film of the optical sheet according to the first embodiment.

The light diffusion film 42 also covers the gaps between the adjacent pairs of the light guide plates 3. FIG. 6 is a plan view for explaining the light diffusion film of the optical sheet according to the first embodiment. As illustrated in FIG. 6, the light diffusion film 42 has regions 43A, 43B, 43C, and 43D and regions 44 in one film. In the light diffusion film 42, the regions 43A, 43B, 43C, and 43D correspond to the display regions 20A, 20B, 20C, and 20D, respectively, illustrated in FIG. 2. In other words, the regions 43A, 43B, 43C, and 43D cover the emitting surfaces of the light guide plates 3.

As described above, the display device 1 according to the first embodiment includes the translucent front plate 11, the display panels 2, and the backlight unit 8. The backlight unit 8 includes the light guide plates 3 and the light source 5 that causes light to be incident on the light guide plates 3. The display panels 2 are bonded to the front plate 11 and are smaller than the front plate 11. The light guide plates 3 are disposed facing the respective display panels 2 in one-to-one correspondence.

This configuration has no emitting surface of the light guide plates 3 between the aligned display panels 2, thereby making the boundaries between the display regions 20A, 20B, 20C, and 20D less likely to be visually recognized. As a result, the display device 1 can have a larger screen composed of the display panels 2.

The haze of at least the region 44 illustrated in FIG. 6 is higher than that of any one of the regions 43A, 43B, 43C, and 43D. The haze can be appropriately changed by changing the printing density of a light diffuser added to a translucent base material. The haze can be measured based on Plastics—Determination of haze for transparent materials (JIS K 7136).

As illustrated in FIG. 3, the difference between partial hazes of the optical sheet 4 is affected by the difference between partial hazes of the light diffusion film 42 because the luminance enhancement film 41 and the light diffusion film 42 overlap each other. Consequently, the optical sheet 4 covering the gaps between the adjacent light guide plates 3 has a higher haze than the regions of the optical sheet 4 covering the emitting surfaces facing the display panels 2. This configuration further makes the boundaries between the display regions 20A, 20B, 20C, and 20D less likely to be visually recognized. As a result, the display device 1 can have a larger screen composed of the display panels 2.

The hazes of the regions 43A, 43B, 43C, and 43D illustrated in FIG. 6 may be equal to or different from one another. When the display regions 20A, 20B, 20C, and 20D have different resolutions, for example, it is possible, by setting the hazes of the regions 43A, 43B, 43C, and 43D illustrated in FIG. 6 to appropriate different values, to adjust the tones of the display regions 20A, 20B, 20C, and 20D uniformly.

While the curved part of the front plate 11 is curved as a whole with the curvature R1, for example, the present embodiment is not limited thereto. In a front plate according to another aspect, for example, a curved surface part having a first curvature and a curved surface part having a second curvature different from the first curvature may be coupled by a coupling member. Alternatively, in a front plate according to another aspect, the curved surface part having the second curvature may be a concave surface when viewed from the display panel 2 if the curved surface part having the first curvature is a convex surface, and the curved surface part having the second curvature may be a convex surface when viewed from the viewer if the curved surface part having the first curvature is a concave surface.

Second Embodiment

Figure 7:
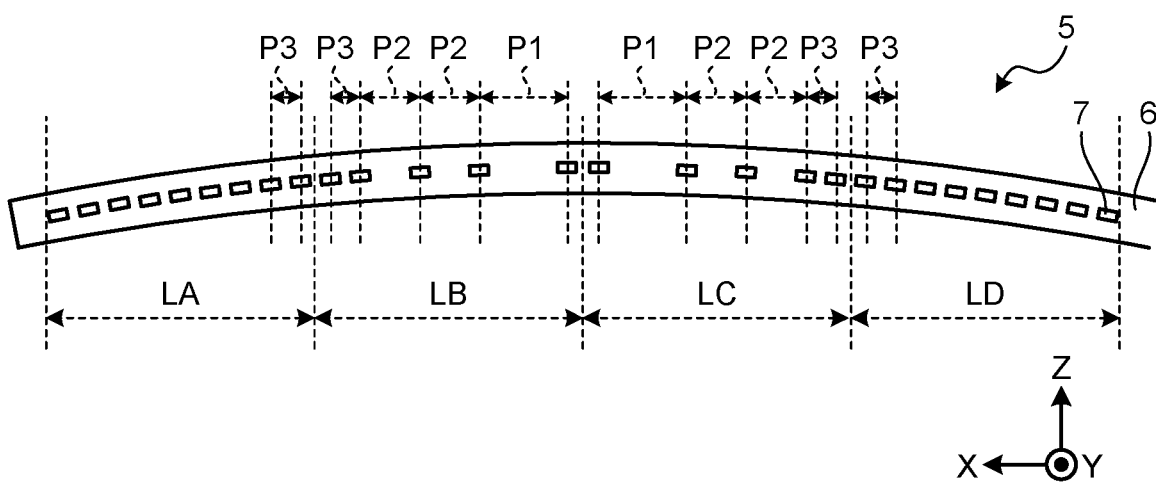
FIG. 7 is a plan view of the light source according to a second embodiment.

FIG. 7 is a plan view of the light source according to a second embodiment. In the description of the second embodiment, the same components as those according to the first embodiment are denoted by the same reference numerals, and detailed explanation thereof is omitted. The display device according to the second embodiment is different from the display device 1 according to the first embodiment only in the light source 5 illustrated in FIG. 7.

As illustrated in FIG. 3, the front plate 11 is curved as a whole with the curvature R1. Consequently, both ends of the front plate 11 in the X-axis direction are closer to the viewer than the center part is when viewed from the viewer. As illustrated in FIG. 1, the normal directions of the light guide plates 3 face the center of the front plate 11 in the X-axis direction. As a result, the amount of light emitted from the light guide plates 3 is likely to be larger in the center part of the front plate 11 in the X-axis direction than in both end parts of the front plate 11 in the X-axis direction.

As illustrated in FIG. 7, the light source 5 according to the second embodiment is configured such that the area density of the light emitting elements 7 disposed in the regions LA and LD is higher than that of the light emitting elements 7 disposed in the regions LB and LC. This configuration can increase the amount of light emitted from the light guide plates 3 in the regions LA and LD positioned at both ends of the front plate 11 in the X-axis direction.

As described above, the light source 5 includes the light emitting elements 7. As illustrated in FIG. 1, the front plate 11 has a curved part in which both end parts in one direction are closer to the viewer than the center part is when viewed from the viewer. The area density of the light emitting elements 7 that cause light to be incident on the light guide plates 3 facing the display panels 2 positioned at both end parts is higher than that of the light emitting elements 7 that cause light to be incident on the light guide plates 3 facing the display panels 2 positioned at the center part. As a result, the distribution of the amount of light in the regions LA, LB, LC, and LD is less likely to be recognized as unevenness in luminance by the viewer.

As illustrated in FIG. 7, in the light source 5 according to the second embodiment, gaps P3 between adjacent pairs of the light emitting elements 7 disposed in the regions LA and LD are equal. By contrast, the gaps between adjacent pairs of the light emitting elements 7 disposed in the regions LB and LC become larger as they are closer to the center corresponding to the boundary between the region LB and the region LC. Specifically, a gap P1 between an adjacent pair of the light emitting elements 7 is larger than a gap P2 between an adjacent pair of the light emitting elements 7. The gap P2 between the adjacent light emitting elements 7 is larger than the gap P3 between the adjacent light emitting elements 7.

In other words, the light source 5 has the light emitting elements 7 arrayed such that the gaps between the adjacent pairs of the light emitting elements 7 become larger as they are closer to the center part from both end parts of the front plate 11. In this manner, the gaps between the adjacent pairs of the light emitting elements 7 disposed in the regions LB and LC are formed at irregular pitches. As a result, the distribution of the amount of light is less likely to be recognized as unevenness in luminance by the viewer also in the regions LB and LC.

Third Embodiment

Figure 8:
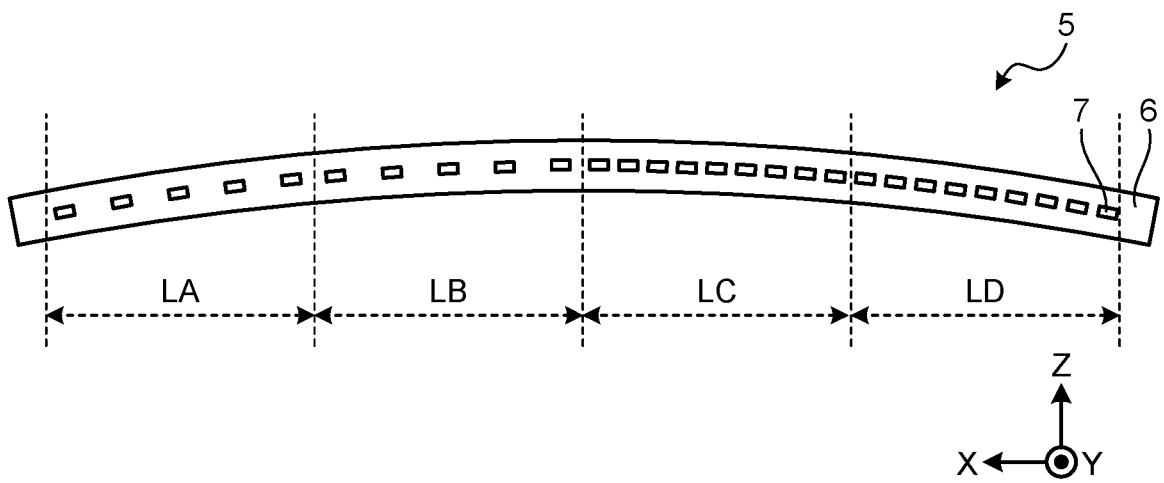
FIG. 8 is a plan view of the light source according to a third embodiment.

FIG. 8 is a plan view of the light source according to a third embodiment. In the description of the third embodiment, the same components as those according to the first embodiment are denoted by the same reference numerals, and detailed explanation thereof is omitted. The display device according to the third embodiment is different from the display device 1 according to the first embodiment only in the light source 5 illustrated in FIG. 8.

As illustrated in FIG. 4, the vehicle 100 is a right-hand drive vehicle, and the display regions closer to the steering wheel 102 are the display regions 20C and 20D. In this specifications, the display regions 20C and 20D may possibly be expected to have higher visibility than the display regions 20A and 20B.

For this reason, the amount of light emitted from the light guide plates 3 at the right part of the front plate 11 in the X-axis direction is made larger than the amount of light emitted from the light guide plates 3 at the left part when viewed from the viewer.

As illustrated in FIG. 8, the light source 5 of the display device according to the third embodiment is configured such that the area density of the light emitting elements 7 disposed in the regions LC and LD is higher than that of the light emitting elements 7 disposed in the regions LA and LB. The front plate 11 is mounted on the dashboard 101 of the vehicle 100. In this case, the number of light emitting elements 7 of the light source 5 corresponding to the display regions 20C and 20D closer to the steering wheel 102 of the vehicle 100 is larger than the number of light emitting elements 7 of the light source 5 corresponding to the display regions 20A and 20B farther away from the steering wheel 102. This configuration can increase the amount of light emitted from the light guide plates 3 in the regions LC and LD positioned at the right part of the front plate 11 in the X-axis direction. This facilitates the viewer's recognizing the display regions 20C and 20D.

If the vehicle 100 is a left-hand drive vehicle, and the display regions closer to the steering wheel 102 are the display regions 20A and 20B, the light source 5 is configured such that the area density of the light emitting elements 7 disposed in the regions LA and LB is higher than that of the light emitting elements 7 disposed in the regions LC and LD.

Fourth Embodiment

Figure 9:
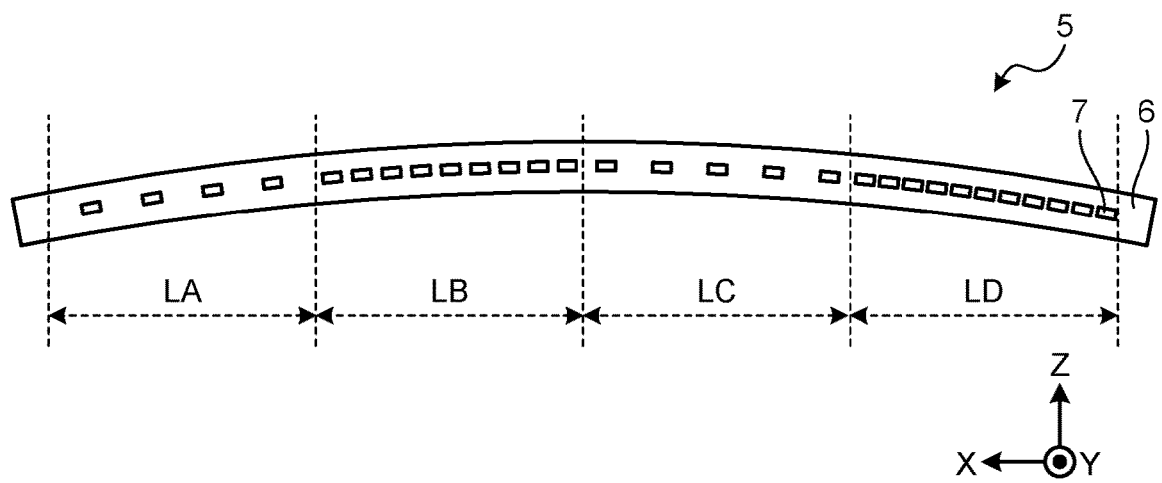
FIG. 9 is a plan view of the light source according to a fourth embodiment.

FIG. 9 is a plan view of the light source according to a fourth embodiment. In the description of the fourth embodiment, the same components as those according to the first embodiment are denoted by the same reference numerals, and detailed explanation thereof is omitted. The display device according to the fourth embodiment is different from the display device 1 according to the first embodiment only in the light source 5 illustrated in FIG. 9.

In the display device according to the fourth embodiment, required luminance varies among the display regions 20A, 20B, 20C, and 20D illustrated in FIG. 2. In the fourth embodiment, higher luminance is required in order of the display region 20D, the display region 20B, the display region 20C, and the display region 20A.

In the display device according to the fourth embodiment, the light source 5 illustrated in FIG. 9 has a smaller area density of the light emitting elements 7 in order of the region LD, the region LB, the region LC, and the region LA. As a result, the number of light emitting elements 7 that cause light to be incident on one plate of an adjacent pair of the light guide plates 3 is different from the number of light emitting elements 7 that cause light to be incident on the other plate of the adjacent pair of the light guide plates 3. With this configuration, the amount of light emitted from the light guide plates 3 can be made smaller in order of the display region 20D, the display region 20B, the display region 20C, and the display region 20A. As a result, the video is displayed with the luminance required in the display regions 20A, 20B, 20C, and 20D, thereby facilitating the viewer's recognizing the video.

Modification of Fourth Embodiment

Figure 10:
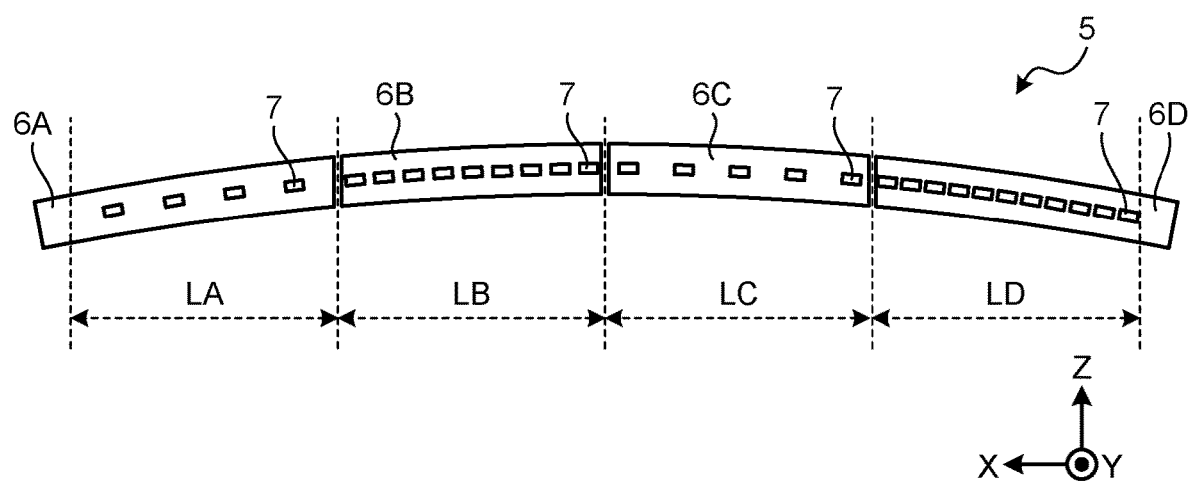
FIG. 10 is a plan view of the light source according to a modification of the fourth embodiment.

FIG. 10 is a plan view of the light source according to a modification of the fourth embodiment. In the description of the modification of the fourth embodiment, the same components as those according to the fourth embodiment are denoted by the same reference numerals, and detailed explanation thereof is omitted. The display device according to the modification of the fourth embodiment is different from the display device 1 according to the first embodiment only in the light source 5 illustrated in FIG. 10.

The light source 5 illustrated in FIG. 10 includes a plurality of flexible substrates 6A, 6B, 6C, and 6D. The flexible substrates 6A, 6B, 6C, and 6D are disposed in one-to-one correspondence with the respective light guide plates 3.

With this configuration, the flexible substrates 6A, 6B, 6C, and 6D can be independently controlled. Also in the modification of the fourth embodiment, in a manner similar to the fourth embodiment, higher luminance is required in order of the display region 20D, the display region 20B, the display region 20C, and the display region 20A. In the modification of the fourth embodiment, while the area density of the light emitting elements 7 varies, the amounts of electric power supplied to the respective flexible substrates 6A, 6B, 6C, and 6D are adjusted. Consequently, it is possible to adjust more precisely the amount of light emitted from the light emitting elements 7 of the light source 5 disposed on the flexible substrates 6A, 6B, 6C, and 6D in accordance with the required luminance.

Out of other advantageous effects provided by the aspects described in the embodiments above, advantageous effects clearly defined by the description in the present specification or appropriately conceivable by those skilled in the art are naturally provided by the present aspects. The embodiments above may be appropriately combined.

What is claimed is:

1. A display device having a curved display surface, comprising:
   a back cover;
   a plurality of light guide plates supported by the back cover;
   a plurality of light sources configured to cause light to be incident on the light guide plates; and
   an optical sheet covering the light guide plates,
   wherein
   the optical sheet faces the light guide plates,
   a gap between an adjacent pair of the light guide plates is covered with the optical sheet,
   an area of the optical sheet is larger than a combined area of all of the light guide plates, and
   a filter made of translucent optical resin or translucent silicon resin is provided in the gap between the adjacent pair of the light guide plates.

2. A vehicle comprising the display device of claim 1, wherein the display device is mounted on a dashboard.

3. The display device of claim 1, wherein the optical sheet is a light diffusion film.

4. The display device of claim 3, wherein a part of the light diffusion film covering the gap between the adjacent pair of the light guide plates has a higher haze than another part of the light diffusion film covering the light guide plates.

5. The display device of claim 1, wherein the optical sheet is a luminance enhancement film.

6. The display device of claim 1, wherein
   the back cover has a curved surface, and
   the light guide plates are disposed along the curved surface.

7. The display device of claim 1, wherein
   the back cover has a curved frame, and
   the light guide plates are disposed along the curved frame.

8. The display device of claim 1, wherein the light guide plates as a whole are arranged along a curved shape.

9. A display device having a curved display surface, comprising:
   a front frame that is a curved frame;
   a plurality of light guide plates arranged along the curved frame;
   a plurality of a light sources configured to cause light to be incident on the light guide plates; and
   an optical sheet covering the light guide plates,
   wherein
   the optical sheet has a curbed surface along the curved frame,
   the curved surface of the optical sheet faces light guide plates,
   a gaps gap between an adjacent pair of the light guide plates is covered with the curved surface of the optical sheet,
   an area of the optical sheet is larger than a combined area of all of the light guide plates, and
   a filter made of translucent optical resin or translucent silicon resin is provided in the gap between the adjacent pair of the light guide plates.

10. A vehicle comprising the display device of claim 9, wherein the display device is mounted on a dashboard.

11. The display device of claim 9, wherein the optical sheet is a light diffusion film.

12. The display device of claim 11, wherein a part of the light diffusion film covering the gap between the adjacent pair of the light guide plates has a higher haze than another part of the light diffusion film covering the light guide plates.

13. The display device of claim 9, wherein the optical sheet is a luminance enhancement film.

\* \* \* \* \*